(12) United States Patent
Dietsch et al.

(10) Patent No.: US 12,084,203 B1
(45) Date of Patent: Sep. 10, 2024

(54) METHOD OF MAKING COMPOSITE AIRCRAFT PRIMARY STRUCTURES

(71) Applicant: Cornerstone Research Group, Inc., Miamisburg, OH (US)

(72) Inventors: Ben Dietsch, Kettering, OH (US); Bryan Pelley, Sugarcreek Township, OH (US); Karl Gruenberg, Washington Township, OH (US); Jason Hermiller, Lebanon, OH (US)

(73) Assignee: Cornerstone Research Group, Inc., Miamisburg, OH (US)

( * ) Notice: Subject to any disclaimer, the term of this patent is extended or adjusted under 35 U.S.C. 154(b) by 330 days.

(21) Appl. No.: 17/718,477

(22) Filed: Apr. 12, 2022

Related U.S. Application Data

(60) Provisional application No. 63/173,686, filed on Apr. 12, 2021.

(51) Int. Cl.
| | |
|---|---|
| *B29B 11/12* | (2006.01) |
| *B29B 11/16* | (2006.01) |
| *B29C 65/48* | (2006.01) |
| *B29C 65/56* | (2006.01) |
| *B29C 70/12* | (2006.01) |
| *B29C 70/34* | (2006.01) |
| *B64F 5/10* | (2017.01) |
| *B29K 105/12* | (2006.01) |

(Continued)

(52) U.S. Cl.
CPC ............... *B64F 5/10* (2017.01); *B29B 11/12* (2013.01); *B29B 11/16* (2013.01); *B29C 65/4835* (2013.01); *B29C 65/565* (2013.01); *B29C 70/12* (2013.01); *B29C 70/34* (2013.01); *B29K 2105/12* (2013.01); *B29K 2307/04* (2013.01); *B29L 2031/3076* (2013.01)

(58) Field of Classification Search
None
See application file for complete search history.

(56) References Cited

U.S. PATENT DOCUMENTS

| | | | |
|---|---|---|---|
| 2002/0053175 A1* | 5/2002 | McKague, Jr. | ... B29C 66/12441 52/309.13 |
| 2003/0146346 A1* | 8/2003 | Chapman, Jr. | .......... B29C 65/56 244/123.3 |

(Continued)

*Primary Examiner* — Yung-Sheng M Tsui
(74) *Attorney, Agent, or Firm* — DINSMORE & SHOHL LLP

(57) ABSTRACT

Methods of making a composite aircraft primary structure include selecting a compression moldable composite sheet molding compound; preparing a first and a second layup with the compression moldable composite sheet molding compound to form a first and a second 3D preform; and compression molding the first and the second 3D preforms to form a first and a second component part. Further, the first component part comprises first geometric joint features, the second component part comprises second geometric joint features, and the second geometric joint features are complementary to the first geometric joint features such that the second geometric joint features are configured to mate with the first geometric joint features. The method further includes assembling the aircraft primary structure by joining the first component part with the second component part by aligning and mating the first geometric joint features and the second geometric joint features; and securing the same.

20 Claims, 4 Drawing Sheets

(51) Int. Cl.
*B29K 307/04* (2006.01)
*B29L 31/30* (2006.01)

(56) References Cited

U.S. PATENT DOCUMENTS

| | | | |
|---|---|---|---|
| 2006/0115320 A1* | 6/2006 | Wood | B64C 1/06 |
| | | | 403/232.1 |
| 2006/0243382 A1* | 11/2006 | Kilwin | B29C 66/43441 |
| | | | 156/285 |
| 2007/0298200 A1* | 12/2007 | Muller | B29C 70/205 |
| | | | 428/36.1 |
| 2018/0072398 A1* | 3/2018 | Sartorius | B64C 3/28 |
| 2019/0070791 A1* | 3/2019 | Gunner | B29C 70/72 |

* cited by examiner

METHOD OF MAKING COMPOSITE AIRCRAFT PRIMARY STRUCTURES

CROSS-REFERENCE TO RELATED APPLICATIONS

This application claims priority to U.S. Provisional Application 63/173,686, filed Apr. 12, 2021, which is incorporated by reference herein in its entirety.

STATEMENT REGARDING FEDERALLY SPONSORED RESEARCH OR DEVELOPMENT

This invention was made with U.S. Government support under Contract No. W31P4Q-19-C-0100 awarded by the U.S. Army Contracting Command to Cornerstone Research Group Inc. The U.S. Government has certain rights in the invention.

TECHNICAL FIELD

Embodiments of the present disclosure relate to methods of forming and assembling composite aircraft primary load-bearing structures.

BACKGROUND

The rapid rate of development and production of new air vehicles results in a desire for faster fabrication processes. One time consuming element of aircraft fabrication processes is the assembly of all of the complex components required to create the air vehicle shape and structure. Typical aircraft primary structure assembly processes include individual skin and internal structure pieces that are mechanically fastened together or in some cases bonded together. The process for creating the provisions for fastening, typically drilling holes, as well as the process for holding the pieces in the correct locations during assembly through the use of assembly jigs requires significant time and capital expense. In addition, these processes require inspection steps to ensure the processes were performed correctly. Ultimately, these processes increase the lead time and cost of assembled aircraft structures.

The use of composite materials in air vehicle structures provides advantages of weight savings as well as the potential for fabrication of unique structures at a lower total cost compared an equivalent structure fabricated from metal. Even with these advantages, composite materials are typically treated as "black aluminum" referring to the simple exchange of composite material in place of metallic material but with little redesign of the overall structure and assembly process. Thus, the adoption of state-of-the-art composite aircraft components saves weight, but does not improve the lead time or cost of assembly for aircraft manufacture. Furthermore, the composite aircraft parts used in the state-of-art aircraft structure are typically made by layup of prepreg composite with continuous fiber reinforcement to the desired part shape in a mold, followed by heat curing in a vacuum bag under pressure inside an autoclave or oven. As in the assembly of metal parts, the cured composite parts still need to be inspected separately before being assembled, fastened, and/or adhesively bonded together by skilled technician using various equipment for alignment of the parts. Thus, although the fabrication costs for such composite aircraft parts are relatively lower compared with metal parts, such part fabrication is still labor intensive, have long cure time, and/or require significant capital equipment for automation. Thus, an alternate solution to reduce or eliminate these assembly steps is desired to achieve the goals of more rapid air vehicle development and production.

SUMMARY

As such, there is an ongoing need for an alternative methods of making aircraft primary structures. The present disclosure addresses these needs with methods of manufacture for aircraft primary load-bearing structures utilizing compression moldable composite sheet molding compounds and joint designs that are novel in manufacture of aircraft primary structures, compression moldable composite sheet molding compound used in these methods comprise thermoplastic and/or thermosetting polymer and discontinuous carbon fibers. The methods further include incorporating geometric joint features for alignment of the various components forming the aircraft primary structures, thus facilitating quick and easy assembly of aircraft primary structure component parts.

Embodiments of the present disclosure relate to methods of of making a composite aircraft primary structure. The methods include selecting a compression moldable composite sheet molding compound; preparing a first layup with the compression moldable composite sheet molding compound in a first mold to form a first 3D preform; and preparing a second layup with the compression moldable composite sheet molding compound in a second mold to form a second 3D preform. The methods further include compression molding the first 3D preform and the second 3D preform to form a first component part from the first 3D preform and a second component part from the second 3D preform. Further, the first component part comprises first geometric joint features, the second component part comprises second geometric joint features, and the second geometric joint features are complementary to the first geometric joint features such that the second geometric joint features are configured to mate with the first geometric joint features. The methods additionally include assembling the aircraft primary structure by joining the first component part with the second component part by aligning and mating the first geometric joint features and the second geometric joint features; and securing the first component part and the second component part together Embodiments of the present disclosure additionally relate to methods of making a composite aircraft primary structure which further include preparing at least one additional layup with the compression moldable composite sheet molding compound in one or more additional molds to form one or more additional 3D preforms; compression molding the one or more additional 3D preforms to form one or more additional component parts from the one or more additional 3D preforms comprising additional geometric joint features configured to mate with the first geometric joint features or the second geometric joint features; assembling the aircraft primary structure by joining the one or more additional components parts with the first component part, the second component part, or both the first component part and the second component part by aligning and mating the first geometric joint features and/or the second geometric joint features with the one or more additional geometric joint features of the one or more additional component parts; and securing the one or more additional component parts with the first component part and/or the second component part.

BRIEF DESCRIPTION OF THE DRAWINGS

The following detailed description of specific embodiments of the present disclosure can be best understood when read in conjunction with the following drawings, in which.

DETAILED DESCRIPTION

Figure 1A:
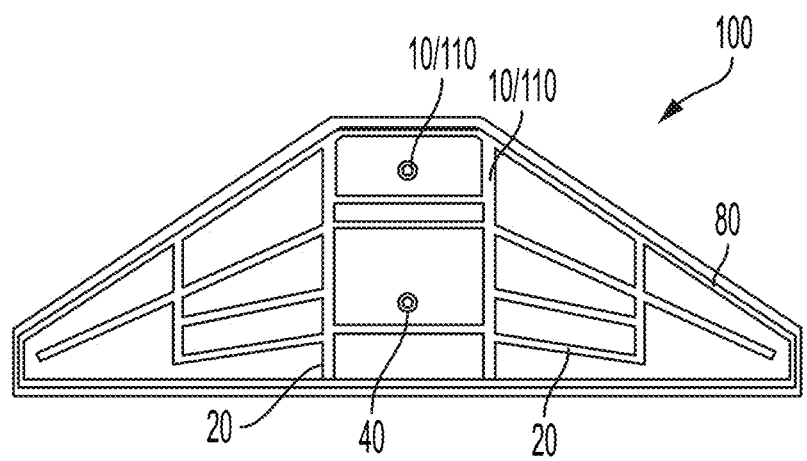
FIG. 1A is a schematic illustration of a first component part of a composite aircraft wing structure according to one or more embodiments of the present disclosure.

Embodiments of the present disclosure generally relate to methods of making a composite aircraft primary structure. Example aircraft primary structures include a wing or wing component, a fuselage, an empennage, a bulkhead, an aircraft control surface, a stabilizer, a nacelle, and an engine air duct. Generally, methods and techniques of the present disclosure seek to significantly improve the speed and efficiency of manufacturing aircraft primary structures by utilizing compression moldable composite materials with strategically selected material properties to reduce weight of the aircraft structural part while meeting load requirements. In addition, the methods and techniques of the present disclosure employ unique joint designs with complementary geometric joint features for aligning and joining of component parts to form the aircraft primary structure part. Implementation of the unique joint designs allow for a concurrent elimination or significant reduction of complex tools and jigs for part assembly. Such unique joint design enables fast assembly, increases manufacturing efficiency, and reduces overall costs.

In accordance with embodiments of the method of making a composite aircraft primary structure, the method initially comprises selecting a compression moldable composite sheet molding compound. The method further comprises preparing a first layup with the compression moldable composite sheet molding compound in a first mold to form a first 3D preform and preparing a second layup with the compression moldable composite sheet molding compound in a second mold to form a second 3D preform. Further, the method comprises compression molding the first 3D preform and the second 3D preform to form a first component part from the first 3D preform and a second component part from the second 3D preform. In accordance with embodiments of the method, the first component part comprises first geometric joint features, the second component part comprises second geometric joint features, and the second geometric joint features are complementary to the first geometric joint features such that the second geometric joint features are configured to mate with the first geometric joint features. The method additional comprises assembling the aircraft primary structure by joining the first component part with the second component part by aligning and mating the first geometric joint features and the second geometric joint features. Finally, the method comprises securing the first component part and the second component part together.

In one or more embodiments, the method further comprises preparing at least one additional layup with the compression moldable composite sheet molding compound in one or more additional molds to form one or more additional 3D preforms. Additionally, the method may further comprise compression molding the one or more additional 3D preforms to form one or more additional component parts from the one or more additional 3D preforms comprising additional geometric joint features configured to mate with the first geometric joint features or the second geometric joint features. Thereafter, the method comprises assembling the aircraft primary structure by joining the one or more additional components parts with the first component part, the second component part, or both the first component part and the second component part by aligning and mating the first geometric joint features and/or the second geometric joint features with the one or more additional geometric joint features of the one or more additional component parts. Finally, the method may additionally comprise securing the one or more additional component parts with the first component part and/or the second component part.

Having generally described methods of making a composite aircraft primary structure, the specific steps and components will now be described in further detail.

A compression moldable composite sheet molding compound is utilized in the various embodiments of the method of making a composite aircraft primary structure. It will be appreciated by one skilled in the art that compression molding is a composite manufacturing process used to produce composite components where multiple copies of each part will ultimately be formed. Such technique is useful in the production of components for aircrafts where the same standardized components will be needed for each aircraft. The compression moldable composite sheet molding compound comprises a thermosetting or a thermoplastic polymer phase, and a structural fiber reinforcement phase. More specifically, in accordance with the generally understood meaning of a molding compound, the polymer phase and the structural fiber reinforcement phase are provided as a semi-cured composite. That is the compression moldable composite sheet molding compound includes semi-cured polymer resin to allow for ease of handling and transport of the compression moldable composite sheet molding compound.

Molding compounds may generally be provided as sheet molding compounds where the provided geometric form is as a sheet or as bulk molding compounds where the molding compound is provided as a dough in logs or blocks or with an amorphous geometric form. It will be appreciated that generally in the field of compression molding a sheet molding compound or a bulk molding compound may be selected to meet the geometric constraints as well as desired mechanical properties of the composite part to be formed. For the purposes of the present disclosure, the molding compounds utilized are sheet molding compounds. Selection of sheet molding compounds provides advantageous mechanical properties to the formed composite parts as the reinforcement material and other components of the molding compound may be selected to optimize the final mechanical properties of the composite part without concern about the viscosity of the molding compound during compression molding operations. Specifically, with bulk molding compound the molding compound must flow to the extremes of the mold which can result in uneven distribution of reinforcement material or limitations on the allowable viscosity of the molding compound.

There are two types of compression molding process including cold compression processes and hot compression molding processes. In compression molding process, pressure is applied in cold compression and pressure and elevated temperature in hot compression molding after the molding compound is placed in a mold cavity. In cold compression molding, the curing process takes place at room temperature while for hot compression molding the curing takes place by applying heat to the mold which is transferred to the molding compound.

In one or more embodiments, the compression moldable composite sheet molding compound comprises a compression moldable thermosetting composite resin or a compression moldable thermoplastic composite resin. As such, a hot compression molding process is utilized. Non-limiting examples of the compression moldable thermosetting composite resin which may be utilized in one or more embodiments include vinyl ester and epoxy. Non-limiting examples of the compression moldable thermoplastic composite resin which may be utilized in one or more embodiments include Polyether ether ketone (PEEK) and Polyaryletherketone (PAEK). In one or more embodiments, the compression moldable composite sheet molding compound is a thermosetting sheet molding compound such as Quantum AMC-8593 commercially available from Lyondell-Basell (Rotterdam, Netherlands).

The compression moldable composite sheet molding compound comprises discontinuous carbon fibers. Discontinuous carbon fibers, opposed to conventional fiber reinforced composite with continuous fibers, provided beneficial enhancements to the resulting composite parts. It will be appreciated that discontinuous fibers provide improved conformability and flow of the material into the mold cavities, thereby enabling unique part geometries. In one or more embodiments, the compression moldable composite sheet molding compound comprises discontinuous carbon fibers of 0.25" to 2.0" in length. In various further embodiments, the compression moldable composite sheet molding compound comprises discontinuous carbon fibers of 0.5" to 2.0" in length, 1" to 2.0" in length, 0.25" to 1.5" in length, 0.25" to 1.0" in length, or 0.5" to 1.5" in length. It will be appreciated that reduction of the length of the discontinuous carbon fibers results in a commensurate reduction in the material tensile strength and modulus of the final part. Conversely, lengthening the discontinuous carbon fibers reduces the ease of the material forming to the mold cavities.

In one or more embodiments, loading of the discontinuous carbon fibers in the compression moldable composite sheet molding compound ranges from 20% by volume to 60% by volume. In various further embodiments, loading of the discontinuous carbon fibers in the compression moldable composite sheet molding compound ranges from of 20% to 50% by volume, 20% to 40% by volume, 30% to 60% by volume, or 40% to 60% by volume. It will be appreciated that if excessive carbon fiber is added the compression moldable composite sheet molding compound may be resin poor resulting in poor mechanical properties. Similarly, if insufficient carbon fiber is added the compression moldable composite sheet molding compound may be resin rich also resulting in poor mechanical properties.

Embodiments of the method of making a composite aircraft primary structure include preparing a first layup with the compression moldable composite sheet molding compound in a first mold to form a first 3D preform. Specifically, in one or more embodiments, one or more sheets of the compression moldable composite sheet molding compound are trimmed to conform to the size of the first mold. The sheets of the compression moldable composite sheet molding compound are then placed in the first mold to form the first 3D preform. The first 3D preform represents the initial layup of the first component part with the compression moldable composite sheet molding compound.

Embodiments of the method of making a composite aircraft primary structure also include preparing a second layup with the compression moldable composite sheet molding compound in a second mold to form a second 3D preform. Specifically, in one or more embodiments, one or more sheets of the compression moldable composite sheet molding compound are trimmed to conform to the size of the second mold. The sheets of the compression moldable composite sheet molding compound are then placed in the second mold to form the second 3D preform. The second 3D preform represents the initial layup of the second component part with the compression moldable composite sheet molding compound.

Embodiments of the method of making a composite aircraft primary structure may also include preparing at least one additional layup with the compression moldable composite sheet molding compound in one or more additional molds to form one or more additional 3D preforms. Specifically, in one or more embodiments, one or more sheets of the compression moldable composite sheet molding compound are trimmed to conform to the size of the additional mold. The sheets of the compression moldable composite sheet molding compound are then placed in the additional mold to form the additional 3D preform. The additional 3D preform represents the initial layup of the one or more additional component parts with the compression moldable composite sheet molding compound.

It will be appreciated that layups in further additional molds may be prepared to generate yet further component parts. Specifically, while preparation of the first layup and the second layup to generate the 3D preforms for the first component part and the second component part respectively are explicitly delineated, it will be appreciated that such preparation may be repeated a multiplicity of times to generate a full set of desired component parts to ultimately form the desired section of the composite aircraft primary structure. For example, a wing may be formed from two, three, four, five, six, seven, eight, nine, ten, or even more than 10 individual component parts which may be assembled in accordance with the methods of the present disclosure.

Embodiments of the method of making a composite aircraft primary structure also include compression molding the first 3D preform and the second 3D preform to form a first component part from the first 3D preform and a second component part from the second 3D preform. Specifically, the first 3D preform and the second 3D preform are heated under pressure in the first mold and the second mold to cure the compression moldable composite sheet molding compound and form the first component part and the second component part. That is, in accordance with compressing molding procedures the composite sheet molding compound is compressed under pressure within one of the molds with heat added to the composite sheet molding compound while maintaining compression until the compression moldable composite sheet molding compound is cured. After the compression moldable composite sheet molding compound has cured the resulting component part, such as the first component part or the second component part, may be demolded.

In accordance with one or more embodiments, compression molding the 3D preforms to form the component parts is completed with a compressive force pressing the mold together to from the desired geometry of the component parts. The mold, such as the first mold or the second mold, is generally a two-piece mold which forms the envelope of the resulting component part formed with the mold. However, it will be appreciated that molds with more than two-pieces, such as three-pieces, four-pieces, or five-pieces, may be utilized as well. In various embodiments, the compressive force applied to compress the 3D preform within the mold is applied at a force of 500 to 2.500 pounds per square inch (psi), 1,000 to 2,500 psi, 1,500 to 2,500 psi. 500 to 2,000 psi. 1,000 to 2,000 psi, or 1,500 to 2,000 psi.

Figure 1B:
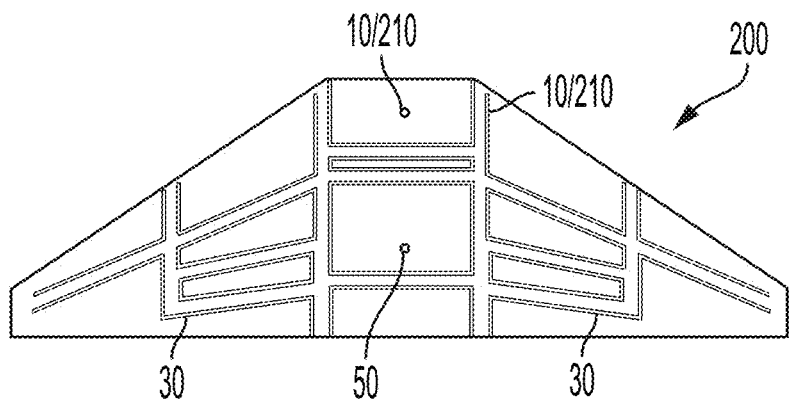
FIG. 1B is a schematic illustration of a second component part of a composite aircraft wing structure according to one or more embodiments of the present disclosure.
Figure 1C:
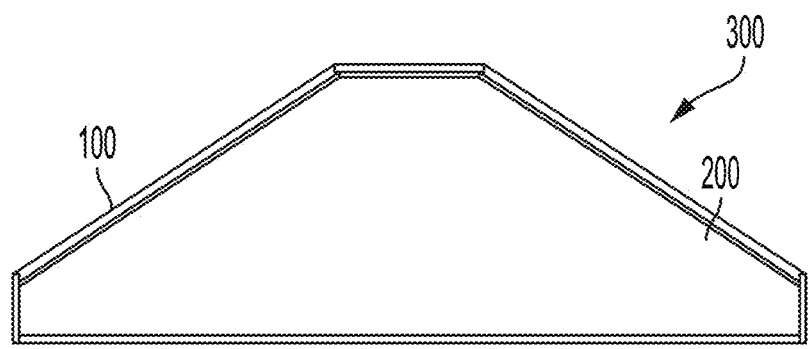
FIG. 1C is a schematic illustration of the composite aircraft wing structure formed from assembly of the first component part of FIG. 1A and the second component part of FIG. 1B according to one or more embodiments of the present disclosure.

With reference to FIGS. 1A and 1B, an example first component part 100 and an example second component part 200 are illustrated. The first component part 100 comprises first geometric joint features 110 and the second component part 200 comprises second geometric joint features 210. The second geometric joint features 210 are complementary to the first geometric joint features 110 such that the second geometric joint features 210 are configured to mate with the first geometric joint features 110. Such mating is illustrated in FIG. 1C where the first component part 100 is assembled with the second component part 200 to form the aircraft primary structure 300, and more particularly a composite aircraft wing structure as illustrated in FIG. 1C.

The geometric joint features 10, including the first geometric joint features 110 and the second geometric joint features 210, represent features included on the component parts 100/200 that allow the component parts 100/200 to be aligned and joined together rapidly. The precise positioning of the geometric joint features 10 allows for the component parts 100/200 to be assembled and automatically aligned in the proper orientation and positions without requiring expensive and time consuming jigs or alignment tools.

In various embodiments, the geometric joint features 10 may comprise one or more of a Pi-joint, a channel, a post, a tube, a rod, a hole, a raised area, or a recessed area. For example, the first geometric joint features 110 may comprise one or more of a Pi-joint, a channel, a post, a tube, a rod, a hole, a raised area, or a recessed area and the second geometric joint features 210 may comprise one or more of a Pi-joint, a channel, a post, a tube, a rod, a hole, a raised area, or a recessed area complementary to each of the first geometric joint features 110. Each of the types of geometric joint features 110 explicitly disclosed will be addressed individually along with explanation of their complimentary nature.

Figure 2A:
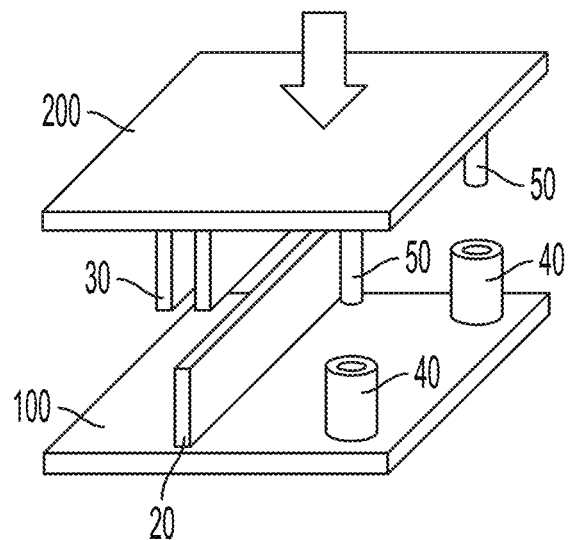
FIG. 2A is a schematic illustration of geometric joint features on a first component part and a second component part according to one or more embodiments of the present disclosure.
Figure 2B:
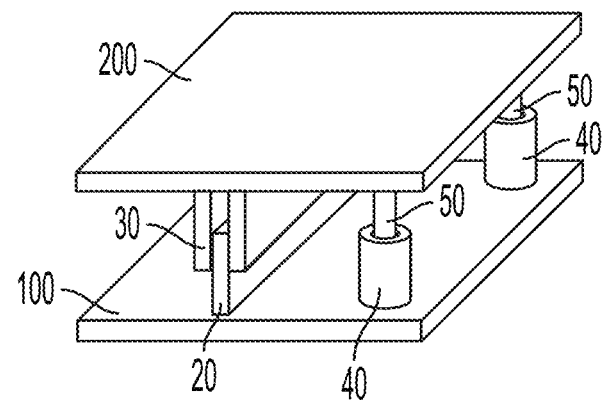
FIG. 2B is a schematic illustration of the first component part and the second component part of FIG. 2A in an assembled configuration.

In one or more embodiments and with reference to FIGS. 2A and 2B, the geometric joint features 10 include one or more Pi-joints 20 and one or more complementary channels 30. For example, a series of Pi-joints 20 or stiffeners may be provided as one of the first geometric joint features 110 on the first component part 100 and complementary channels 30 may be provided as one of the second geometric joint features 210 on the second component part 200. The channels 30 may be formed by integrally molded stiffeners with the second component part 200 such that the Pi-joint 20 may be provided into the channel 30. It is noted that while the Pi-joint 20 is illustrated as the first geometric joint feature 110 and the channel 30 is illustrated as the second geometric joint feature 210, the geometric joint features 10 are envisioned as being able to be included as part of any of the component parts and are not intended to be limited to certain component parts.

In one or more embodiments and with reference to FIGS. 2A and 2B, the geometric joint features 10 include one or more tubes 40 and one or more complementary posts 50. For example, a series of tubes 40 may be provided as one of the first geometric joint features 110 on the first component part 100 and complementary posts 50 may be provided as one of the second geometric joint features 210 on the second component part 200. The posts 50 and tubes 40 are sized to allows the posts 50 to be inserted into the tubes 40. It is noted that while the tubes 40 are illustrated as the first geometric joint feature 110 and the posts 50 are illustrated as the second geometric joint feature 210, the geometric joint features 10 are envisioned as being able to be included as part of any of the component parts and are not intended to be limited to certain component parts.

Figure 3A:
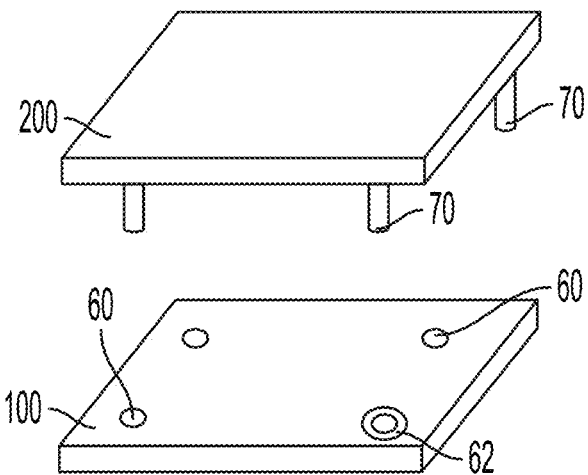
FIG. 3A is a schematic illustration of geometric joint features on a first component part and a second component part according to one or more embodiments of the present disclosure.
Figure 3B:
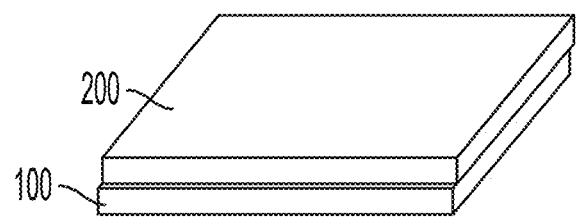
FIG. 3B is a schematic illustration of the first component part and the second component part of FIG. 3A in an assembled configuration.

In one or more embodiments and with reference to FIGS. 3A and 3B, the geometric joint features 10 include one or more holes 60 within the component part and one or more complementary rods 70 sized to fit within the holes 60. For example, a series of holes 60 may be provided as one of the first geometric joint features 110 on the first component part 100 and complementary rods 60 may be provided as one of the second geometric joint features 210 on the second component part 200. The holes 60 and rods 70 are sized to allow the rods 70 to be inserted into the holes 60 to align the component parts. It is noted that while the holes 60 are illustrated as the first geometric joint feature 110 and the rods 70 are illustrated as the second geometric joint feature 210, the geometric joint features 10 are envisioned as being able to be included as part of any of the component parts and are not intended to be limited to certain component parts.

Figure 4A:
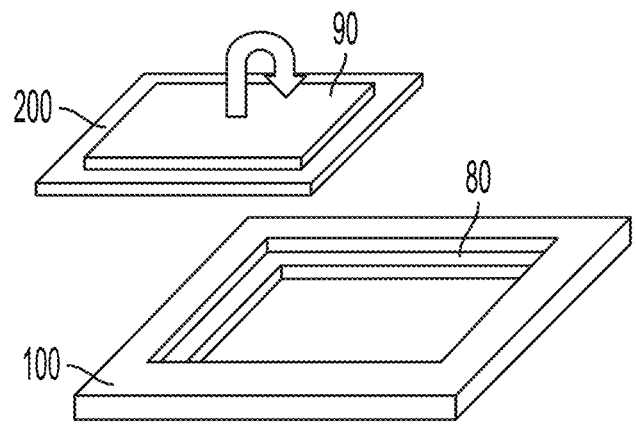
FIG. 4A is a schematic illustration of geometric joint features on a first component part and a second component part according to one or more embodiments of the present disclosure.
Figure 4B:
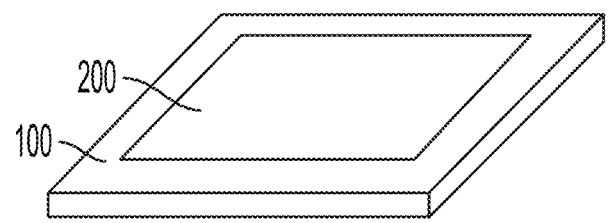
FIG. 4B is a schematic illustration of the first component part and the second component part of FIG. 4A in an assembled configuration.

In one or more embodiments and with reference to FIGS. 4A and 4B, the geometric joint features 10 include one or more recessed areas 80 within the component part and one or more complementary raised areas 90 within another component part. For example, a recessed area 80 may be provided as one of the first geometric joint features 110 on the first component part 100 and complementary raised area 90 may be provided as one of the second geometric joint features 210 on the second component part 200. The recessed area 80 and the raised area 90 may form a half lap joint. One skilled in the art will appreciate that a half lap joint is a joint where two pieces of stock, which are typically the same thickness, have half of the material removed so that the two pieces of stock fit together without adding thickness at the joint. As such, one piece of stock effectively may be viewed as having a raised area and another piece of stock effectively may be viewed as having a recessed area. In one or more embodiments the recessed area 90 may be provided in a central region of the first component part 110 and the raised area may also be provided in a central region of the second component part 210 such that a frame is formed by the first component part 110 into which the second component part 210 may be inserted. It is noted that while the recessed region 80 is illustrated as the first geometric joint feature 110 and the raised area 90 is illustrated as the second geometric joint feature 210, the geometric joint features 10 are envisioned as being able to be included as part of any of the component parts and are not intended to be limited to certain component parts.

In one or more embodiments, preparing the first layup and preparing the second layup comprises positioning one or more sub-component parts made with a material different from the compression moldable composite sheet molding compound within the layups. The sub-component parts allow for increased wear resistance, increased strength, increased electrical conductivity, decreased electrical conductivity including no electrical conductivity, increased thermal conductivity, decreased thermal conductivity, or other desirable properties to be added to specific regions of the component parts. It will be appreciated that when additional component parts are included such that at least one additional layup is prepared to form one or more additional 3D preforms such preforms may additionally or alternatively include one or more sub-component parts.

In one or more embodiments, one or more of the first geometric joint features 110, the second geometric features 210 or both the first geometric features 110 and the second geometric features 210 comprises the one or more sub-component parts. It will be appreciated that when additional component parts are included, the additional geometric joint features included on the one or more additional parts may additionally or alternatively include one or more sub-component parts. An example of a sub-component part which may be included as one of the geometric features 10 is a bushing 62. With reference to FIG. 3A a bushing 62 is illustrated in one of the holes 60 to reinforce the hole 60. The bushing 62 may be formed of a metallic alloy. Additionally, a metallic threaded insert could be integrated into the component part. Similarly, the rod 70 could also be provide as a sub-component made of a metallic alloy. Further, an electrically conductive or non-conductive material may form the rod 70 to provided desired properties. It will be appreciated that forming at least a portion of the geometric features 10 with sub-components added during the preparation of the various layups allows for increased complexity in the shape of the geometric features 10 as well as reduced complexity of the molds. For example, the sub-components may be precision machined with very high tolerances and the mold can precisely position the sub-component to ensure accurate assembly of the composite aircraft primary structure.

Embodiments of the method of making a composite aircraft primary structure may also include compression molding the one or more additional 3D preforms to form one or more additional component parts from the one or more additional 3D preforms comprising additional geometric joint features configured to mate with the first geometric joint features or the second geometric joint features. Preparation of the additional component parts may be completed in the same or similar manner as detailed for at least the first component part and the second component part.

Embodiments of the method of making a composite aircraft primary structure also include assembling the aircraft primary structure by joining the first component part with the second component part by aligning and mating the first geometric joint features and the second geometric joint features. Specifically, the first component part and the second component part are naturally aligned and oriented based on the mating of the first geometric joint features and the second geometric joint features.

Embodiments of the method of making a composite aircraft primary structure may also include assembling the aircraft primary structure by joining the one or more additional components parts with the first component part, the second component part, or both the first component part and the second component part by aligning and mating the first geometric joint features and/or the second geometric joint features with the one or more additional geometric joint features of the one or more additional component parts.

In one or more embodiments, assembling the aircraft primary structure is completed without utilization of an alignment tool or jig as the mating of the first geometric joint features and the second geometric joint features naturally aligns the component parts in the proper alignment and orientation.

Embodiments of the method of making a composite aircraft primary structure also include securing the first component part and the second component part together. Similarly, embodiments of the method of making a composite aircraft primary structure may also include securing the one or more additional component parts with the first component part and/or the second component part. Specifically, the various component parts may be positively secured in their assembled configuration.

In one or more embodiments, securing the various component parts, such as the first component part and the second component part, together is achieved with adhesive bonding. For example, in various embodiments, epoxy or urethane paste may be utilized for the adhesive bonding. Specifically, the adhesive, such as epoxy or urethane paste, may be applied to one or multiple surfaces of the various component parts such that when in the assembled configuration an adhesive bond forms between the various component parts to form a cohesive unit. In one or more embodiments, the adhesive bonding may be achieved at the interface of the geometric joint features on the various component parts. For examples, the interface between one of the first geometric joint features of the first component part, such as a post, and one of the second geometric joint features of the second component part, such as a tube, may be fused together with the adhesive bonding to form a single cohesive unit.

It will be appreciated that temperature capability and solvent resistance of the adhesive used for the adhesive bonding should be considered. Specifically, it is desirable that the adhesive bonding be of sufficient durability to not result in failure during aircraft flight and maintenance operations. As such, it is desirable to use an adhesive that is resistant to solvents such that the adhesive bond is not compromised. Similarly, it will be appreciated that aircraft operate at temperature extremes, both hot and cold, so selection of adhesive to form the adhesive bonding should be made to ensure durability and retention of strength at operational extremes.

In one or more embodiments, securing the various component parts, such as the first component part and the second component part, together is achieved with mechanical fasteners. For example, in various embodiments, screws, rivets, bolts, bonded pins, and combinations thereof may be provided as mechanical fasteners to secure the various component parts together into a single cohesive unit forming an aircraft primary structure. Specifically, one or more mechanical fasteners may be provided connecting at least one of the first geometric joint features or the second geometric joint features to another geometric joint feature. For example, a first geometric joint feature may be mechanically affixed to a second geometric joint feature or one or more of the additional geometric joint features. Similarly, a second geometric joint feature may be mechanically affixed to a first geometric joint feature or one or more of the additional geometric joint features.

In one or more embodiments, securing the various component parts, such as the first component part and the second component part, together is achieved with a combination of adhesive bonding and mechanical fasteners. For example, certain geometric joint features may be secured with adhesive bonding while other geometric joint features may be secured with mechanical fasteners. It will be appreciated that a combination of adhesive bonding and mechanical fasteners provides flexibility in the method of securement to achieve desired mechanical performance and ease of manufacture. For example, adhesives allow for securement at locations which are inaccessible for provision of a mechanical fastener. Similarly, Mechanical fasteners allow for securement between geometric features where achieving a robust adhesive bond would be challenging as a result of limited surface contact between component parts.

It will be appreciated that in order to enable rapid manufacture of composite aircraft primary structure with reduced costs, a material that is low cost, easy to handle during layup of the composite, readily moldable to achieve high tolerance with faster curing and molding time, but still achieve sufficient mechanical properties to enable an assembled aircraft component to withstand the stringent performance requirements such as 4G loading condition during flight is needed. To achieve operational performance including 4G loading conditions reasonably anticipated to be experienced during flight the mechanical properties of the formed component parts must reach minimum performance characteristics.

In one or more embodiments, the compression moldable composite sheet molding compound in a cured state forming the various component parts has a tensile modulus of 15 to 91 GPa. In various embodiments, the compression moldable composite sheet molding compound in a cured state forming the various component parts has a tensile modulus of 15 to 80 GPa, 15 to 60 GPa, 25 to 91 GPa. 35 to 91 GPa, or 25 to 80 GPa. It will be appreciated that a higher tensile modulus within the disclosed ranges, at the expense of potential brittleness, is preferred as at lower moduli the material has greater flexibility which may necessitate a thicker and heavier part to compensate for the low modulus to achieve necessary stiffness for the use application.

Providing a compression moldable composite sheet molding compound which cures with a tensile modulus within the disclosed ranges is believed to provide component parts which are capable of withstanding the 4G loading conditions expected during flight operations. It will be appreciated that each of the first component part 100, the second component part 200, and/or the one or more additional component parts may have a tensile modulus in the stated ranges.

In one or more embodiments, the compression moldable composite sheet molding compound in a cured state forming the first component part and the second component part has a tensile strength of 120 to 1200 MPa. In various embodiments, the compression moldable composite sheet molding compound in a cured state forming the various component parts has a tensile strength of 120 to 1100 MPa, 120 to 1000 MPa, 120 to 800 MPa. 250 to 1200 MPa, or 500 to 1200 MPa. It will be appreciated that a higher tensile strength within the disclosed ranges is preferred as at lower tensile strengths the material may necessitate a thicker and heavier part to compensate for the low tensile strength to achieve necessary strength for the use application.

Providing a compression moldable composite sheet molding compound which cures with a tensile strength within the disclosed ranges is believed to provide component parts which are capable of withstanding the 4G loading conditions expected during flight operations. It will be appreciated that each of the first component part 100, the second component part 200, and/or the one or more additional component parts may have a tensile strength in the stated ranges.

In order that the previously described embodiments may be more easily understood, reference is made to the following example that illustrates one or more features of the present disclosure. The example is in no way intended to be limiting in scope.

To demonstrate the improvement of compression molded composites in enabling the rapid manufacture of composite aircraft primary structures, a comparison between compression moldable composite sheet molding compound and thermoplastic molding resin is made. The use of compression moldable composite sheet molding compound in accordance with that of the present disclosure was used to fabricate a two-piece wing structure for an unmanned air vehicle. The structure of the two-piece wing structure is illustrated in FIGS. 1A through 1C. The compression moldable composite sheet molding compound used contained carbon fibers with a length of 1 inch (nominal), a carbon fiber loading of 50 wt. % (nominal), and with vinyl ester as the resin. The resulting tensile modulus of the cured compression moldable composite sheet molding compound was 20 GPa and the resulting tensile strength was 121 MPa. This two-piece structure, when adhesively bonded together with methacrylate adhesive at the mating interfaces in accordance with the present disclosure was capable of withstanding a 4G loading condition. The same geometry, if fabricated using high performance injection molded thermoplastic material with no reinforcement fibers results in a tensile modulus of 3.5 GPa and tensile strength of 96 MPa and when adhesively bonded together at the mating surfaces is not capable of withstanding same loading conditions.

Having described various embodiments, it should be understood that the various aspects of the method of making a composite aircraft primary structure may be utilized in conjunction with various other aspects.

In a first aspect, the disclosure provides a method of making a composite aircraft primary structure. The method comprises selecting a compression moldable composite sheet molding compound; preparing a first layup with the compression moldable composite sheet molding compound in a first mold to form a first 3D preform; preparing a second layup with the compression moldable composite sheet molding compound in a second mold to form a second 3D preform; and compression molding the first 3D preform and the second 3D preform to form a first component part from the first 3D preform and a second component part from the second 3D preform. Further, the first component part comprises first geometric joint features, the second component part comprises second geometric joint features, and the second geometric joint features are complementary to the first geometric joint features such that the second geometric joint features are configured to mate with the first geometric joint features. The method additionally comprises assembling the aircraft primary structure by joining the first component part with the second component part by aligning and mating the first geometric joint features and the second geometric joint features; and securing the first component part and the second component part together.

In a second aspect, the disclosure provides the method of the first aspect, in which the method further comprises: preparing at least one additional layup with the compression moldable composite sheet molding compound in one or more additional molds to form one or more additional 3D preforms; compression molding the one or more additional 3D preforms to form one or more additional component parts from the one or more additional 3D preforms comprising additional geometric joint features configured to mate with the first geometric joint features or the second geometric joint features; assembling the aircraft primary structure by joining the one or more additional components parts with the first component part, the second component part, or both the first component part and the second component part by aligning and mating the first geometric joint features and/or the second geometric joint features with the one or more additional geometric joint features of the one or more additional component parts; and securing the one or more additional component parts with the first component part and/or the second component part.

In a third aspect, the disclosure provides the method of the first or second aspect, in which the method further comprises securing the first component part and the second component part together with adhesive bonding.

In a fourth aspect, the disclosure provides the method of the second or third aspects, in which the method further comprises securing the one or more additional component parts with the first component part and/or the second component part together with adhesive bonding.

In a fifth aspect, the disclosure provides the method of the third or fourth aspects, in which epoxy or urethane paste is utilized for the adhesive bonding.

In a sixth aspect, the disclosure provides the method of any of the first through fifth aspects, in which the method further comprises securing the first component part and the second component part together with mechanical fasteners in at least one of the first geometric joint features or the second geometric joint features.

In a seventh aspect, the disclosure provides the method of any of the second through sixth aspects, in which the method further comprises securing the one or more additional component parts with the first component part and/or the second component part together with mechanical fasteners in at least one of the first geometric joint features, the second geometric joint features, and the one or more additional geometric joint features.

In an eighth aspect, the disclosure provides the method of and of the first though seventh aspects, in which the method further comprises securing the first component part and the second component part together with a combination of adhesive bonding and mechanical fasteners in at least one of the first geometric joint features or the second geometric joint features.

In a ninth aspect, the disclosure provides the method of any of the second through eighth aspects, in which method further comprises securing the one or more additional component parts with the first component part and/or the second component part together with a combination of adhesive bonding and mechanical fasteners in at least one of the first geometric joint features, the second geometric joint features, and the one or more additional geometric joint features.

In a tenth aspect, the disclosure provides the method of any of the first through ninth aspects, in which the compression moldable composite sheet molding compound comprises discontinuous carbon fibers.

In an eleventh aspect, the disclosure provides the method of the tenth aspect in which the discontinuous carbon fibers are 0.25" to 2.0" in length.

In a twelfth aspect, the disclosure provides the method of the tenth or eleventh aspect, in which loading of the discontinuous carbon fibers in the compression moldable composite sheet molding compound ranges from 20% by volume to 60% by volume.

In a thirteenth aspect, the disclosure provides the method of any of the first through twelfth aspects, in which the compression moldable composite sheet molding compound comprises a compression moldable thermosetting or thermoplastic composite resin In a fourteenth aspect, the disclosure provides the method of any of the first through thirteenth aspects, in which the compression moldable composite sheet molding compound in a cured state forming at least the first component part and the second component part has a tensile modulus of 15 to 91 GPa.

In a fifteenth aspect, the disclosure provides the method of any of the first through fourteenth aspects, in which the compression moldable composite sheet molding compound in a cured state forming the first component part and the second component part has a tensile strength of 120 to 1200 MPa.

In a sixteenth aspect, the disclosure provides the method of any of the first through fifteenth aspects, in which the first geometric joint features comprise one or more of a Pi-joint, a channel, a post, a tube, a rod, a hole, a raised area, or a recessed area.

In a seventeenth aspect, the disclosure provides the method of the sixteenth aspect, in which the second geometric joint features comprise one or more of a Pi-joint, a channel, a post, a tube, a rod, a hole, a raised area, or a recessed area complementary to one or more of the Pi-joint, the channel, the post, the tube, the rod, the hole, the raised area, or the recessed area forming the first geometric joint features.

In an eighteenth aspect, the disclosure provides the method of any of the second through seventeenth aspects, in which the one or more additional geometric joint features comprise one or more of a Pi-joint, a channel, a post, a tube, a rod, a hole, a raised area, or a recessed area complementary to one or more of the Pi-joint, the channel, the post, the tube, the rod, the hole, the raised area, or the recessed area forming the first geometric joint features and/or the second geometric joint features.

In a nineteenth aspect, the disclosure provides the method of the seventeenth or eighteenth aspect in which the raised area and the recessed area form a half-lap joint.

In a twentieth, the disclosure provides the method of any of the first through nineteenth aspects, in which preparing the first layup and preparing the second layup comprises positioning one or more sub-component parts made with a material different from the compression moldable composite sheet molding compound within the layups.

In a twenty-first aspect, the disclosure provides the method of the twentieth aspect, in which one or more of the first geometric joint features, the second geometric features or both the first geometric features and the second geometric features comprises the one or more sub-component parts.

In a twenty-second aspect, the disclosure provides the method of any of the second through twenty-first aspects, in which preparing the one or more additional layups comprises positioning one or more sub-component parts made with a material different from the compression moldable composite sheet molding compound within the layups.

In a twenty-second aspect, the disclosure provides the method of the twenty-first aspect, in which one or more of the one or more additional geometric joint features comprises the one or more sub-component parts.

In a twenty-third aspect, the disclosure provides the method of any of the first through twenty-second aspects, in which the assembling the aircraft primary structure is completed without utilization of an alignment tool or jig.

In a twenty-fourth aspect, the disclosure provides the method of any of the first through twenty-third aspects, in which the aircraft primary structure is one or more of a wing or wing component, a fuselage, an empennage, a bulkhead, an aircraft control surface, a stabilizer, a nacelle, and an engine air duct.

In a twenty-fifth aspect, the disclosure provides the method of any of the first through twenty-fourth aspects, in which the first mold and the second mold each comprise at least two pieces which are mated together to form an enclosed mold envelope.

In a twenty-sixth aspect, the disclosure provides the method of any of the second through twenty-fifth aspects, in which the one or more additional molds each comprise at least two pieces which are mated together to form an enclosed mold envelope.

It should be apparent to those skilled in the art that various modifications and variations may be made to the embodiments described within without departing from the spirit and scope of the claimed subject matter. Thus, it is intended that the specification cover the modifications and variations of the various embodiments described within provided such modification and variations come within the scope of the appended claims and their equivalents.

As used throughout, the singular forms "a." "an" and "the" include plural referents unless the context clearly dictates otherwise. Thus, for example, reference to "a" component includes aspects having two or more such components, unless the context clearly indicates otherwise.

It should be understood that any two quantitative values assigned to a property or measurement may constitute a range of that property or measurement, and all combinations of ranges formed from all stated quantitative values of a given property or measurement are contemplated in this disclosure.

As used here and in the appended claims, the words "comprise." "has." and "include" and all grammatical variations thereof are each intended to have an open, non-limiting meaning that does not exclude additional elements or steps.

Having described the subject matter of the present disclosure in detail and by reference to specific embodiments thereof, it is noted that the various details disclosed within should not be taken to imply that these details relate to elements that are essential components of the various embodiments described within, even in cases where a particular element is illustrated in each of the drawings that accompany the present description. Further, it should be apparent that modifications and variations are possible without departing from the scope of the present disclosure, including, but not limited to, embodiments defined in the appended claims. More specifically, although some aspects of the present disclosure are identified as particularly advantageous, it is contemplated that the present disclosure is not necessarily limited to these aspects.

What is claimed is:

1. A method of making a composite aircraft primary structure comprising:
    selecting a compression moldable composite sheet molding compound;
    preparing a first layup with the compression moldable composite sheet molding compound in a first mold to form a first 3D preform;
    preparing a second layup with the compression moldable composite sheet molding compound in a second mold to form a second 3D preform;
    compression molding the first 3D preform and the second 3D preform to form a first component part from the first 3D preform and a second component part from the second 3D preform, wherein:
        the first component part comprises first geometric joint features;
        the second component part comprises second geometric joint features; and
        the second geometric joint features are complementary to the first geometric joint features such that the second geometric joint features are configured to mate with the first geometric joint features;
    assembling the aircraft primary structure by joining the first component part with the second component part by aligning and mating the first geometric joint features and the second geometric joint features; and
    securing the first component part and the second component part together.

2. The method of claim 1 in which the method further comprises:
    preparing at least one additional layup with the compression moldable composite sheet molding compound in one or more additional molds to form one or more additional 3D preforms;
    compression molding the one or more additional 3D preforms to form one or more additional component parts from the one or more additional 3D preforms comprising additional geometric joint features configured to mate with the first geometric joint features or the second geometric joint features;
    assembling the aircraft primary structure by joining the one or more additional components parts with the first component part, the second component part, or both the first component part and the second component part by aligning and mating the first geometric joint features and/or the second geometric joint features with the one or more additional geometric joint features of the one or more additional component parts; and
    securing the one or more additional component parts with the first component part and/or the second component part.

3. The method of claim 1 in which the method further comprises securing the first component part and the second component part together with adhesive bonding.

4. The method of claim 3 in which epoxy or urethane paste is utilized for the adhesive bonding.

5. The method of claim 1 in which the method further comprises securing the first component part and the second component part together with mechanical fasteners in at least one of the first geometric joint features or the second geometric joint features.

6. The method of claim 1 in which the method further comprises securing the first component part and the second component part together with a combination of adhesive bonding and mechanical fasteners in at least one of the first geometric joint features or the second geometric joint features.

7. The method of claim 1 in which the compression moldable composite sheet molding compound comprises discontinuous carbon fibers of 0.25" to 2.0" in length.

8. The method of claim 7 in which loading of the discontinuous carbon fibers in the compression moldable composite sheet molding compound ranges from 20% by volume to 60% by volume.

9. The method of claim 1 in which the compression moldable composite sheet molding compound comprises a compression moldable thermosetting or thermoplastic composite resin.

10. The method of claim 1 in which the compression moldable composite sheet molding compound in a cured state forming the first component part and the second component part has a tensile modulus of 15 to 91 GPa.

11. The method of claim 1 in which the compression moldable composite sheet molding compound in a cured state forming the first component part and the second component part has a tensile strength of 120 to 1200 MPa.

12. The method of claim 1 in which the first geometric joint features comprise one or more of a Pi-joint, a channel, a post, a tube, a rod, a hole, a raised area, or a recessed area.

13. The method of claim 12 in which the second geometric joint features comprise one or more of a Pi-joint, a channel, a post, a tube, a rod, a hole, a raised area, or a recessed area complementary to one or more of the Pi-joint, the channel, the post, the tube, the rod, the hole, the raised area, or the recessed area forming the first geometric joint features.

14. The method of claim 13 in which the raised area and the recessed area form a half-lap joint.

15. The method of claim 1 in which preparing the first layup and preparing the second layup comprises positioning one or more sub-component parts made with a material different from the compression moldable composite sheet molding compound within the layups.

16. The method of claim 15 in which one or more of the first geometric joint features, the second geometric features or both the first geometric features and the second geometric features comprises the one or more sub-component parts.

17. The method of claim 1 in which the assembling the aircraft primary structure is completed without utilization of an alignment tool or jig.

18. The method of claim 1 in which the aircraft primary structure is one or more of a wing or wing component, a fuselage, an empennage, a bulkhead, an aircraft control surface, a stabilizer, a nacelle, and an engine air duct.

19. The method of claim 1, in which the first mold and the second mold each comprise at least two pieces which are mated together to form an enclosed mold envelope.

20. The method of claim 2, in which the one or more additional molds each comprise at least two pieces which are mated together to form an enclosed mold envelope.

* * * * *